United States Patent
Cho et al.

(10) Patent No.: US 9,689,446 B2
(45) Date of Patent: Jun. 27, 2017

(54) METHOD FOR MAKING THREE DIMENSION PREFORM HAVING HIGH HEAT CONDUCTIVITY AND METHOD FOR MAKING AIRCRAFT BRAKE DISC HAVING THE THREE DIMENSION PREFORM

(71) Applicant: DACC CARBON, Jeonju-si (KR)

(72) Inventors: Chae Wook Cho, Daejeon (KR); Jong Hyun Park, Jeonju (KR); Min Cheol Cho, Daegu (KR); Kap Su Jung, Jeonju (KR); Gi Bum Ryu, Gunsan-si (KR)

(73) Assignee: DACC CARBON, Jeonju-si (KR)

( * ) Notice: Subject to any disclaimer, the term of this patent is extended or adjusted under 35 U.S.C. 154(b) by 171 days.

(21) Appl. No.: 14/580,763

(22) Filed: Dec. 23, 2014

(65) Prior Publication Data

US 2015/0240891 A1 Aug. 27, 2015

(30) Foreign Application Priority Data

Feb. 26, 2014 (KR) ........................ 10-2014-0022371

(51) Int. Cl.
*F16D 65/12* (2006.01)
*B32B 5/12* (2006.01)
*D04H 1/46* (2012.01)
*D04H 1/498* (2012.01)
*D06B 1/00* (2006.01)
(Continued)

(52) U.S. Cl.
CPC .............. *F16D 65/125* (2013.01); *B32B 5/02* (2013.01); *B32B 5/06* (2013.01); *B32B 5/26* (2013.01); *D04H 1/4242* (2013.01); *D04H 1/46* (2013.01); *D04H 1/498* (2013.01); *D04H 13/00* (2013.01); *D04H 18/02* (2013.01); *D06B 1/00* (2013.01); *D06B 9/00* (2013.01); *B32B 2262/106* (2013.01); *B32B 2307/302* (2013.01); *B32B 2307/306* (2013.01); *B32B 2605/18* (2013.01); *F16D 2065/132* (2013.01); *F16D 2200/006* (2013.01); *F16D 2200/0052* (2013.01)

(58) Field of Classification Search
USPC ........................................................ 156/148
See application file for complete search history.

(56) References Cited

U.S. PATENT DOCUMENTS

| 8,030,376 B2 * | 10/2011 | Kurz ....................... C08J 3/2053 |
| | | 523/333 |
| 2005/0176329 A1 * | 8/2005 | Olry ....................... B82Y 30/00 |
| | | 442/388 |

FOREIGN PATENT DOCUMENTS

KR 1020030089880 11/2003
WO WO-2007/044889 A2 * 4/2007

* cited by examiner

Primary Examiner — Jeff Aftergut
(74) Attorney, Agent, or Firm — Hauptman Ham, LLP (57) ABSTRACT

A method of manufacturing a three dimension preform having high thermal conductivity includes: a first step of manufacturing a unidirectional carbon fabric from a heat resistant fiber; a second step of putting the unidirectional carbon fabric into an aqueous solution with carbon nanomaterials contained in a vessel; a third step of taking the unidirectional carbon fabric out of the vessel and then drying the unidirectional carbon fabric; a fourth step of repeating the second step and the third step; a fifth step of stacking the unidirectional carbon fabrics with web carbon fabrics, which are made of a heat resistant fiber, inserted between the unidirectional carbon fabrics; and a sixth step of punching the stacked unidirectional carbon fabrics and the web carbon fabrics with a needle.

9 Claims, 7 Drawing Sheets

(51) Int. Cl.
*D06B 9/00* (2006.01)
*D04H 1/4242* (2012.01)
*D04H 13/00* (2006.01)
*D04H 18/02* (2012.01)
*B32B 5/02* (2006.01)
*B32B 5/06* (2006.01)
*B32B 5/26* (2006.01)
*F16D 65/02* (2006.01)

METHOD FOR MAKING THREE DIMENSION PREFORM HAVING HIGH HEAT CONDUCTIVITY AND METHOD FOR MAKING AIRCRAFT BRAKE DISC HAVING THE THREE DIMENSION PREFORM

CROSS-REFERENCE TO RELATED APPLICATIONS

This application claims the priority of Korean Patent Application No. 10-2014-0022371 filed on Feb. 26, 2014, in the Korean Intellectual Property Office, the disclosure of which is incorporated herein by reference.

BACKGROUND OF THE INVENTION

Field of the Invention

The present invention relates to an aircraft brake disc.

Description of the Related Art

The background of the present invention has been disclosed in Korean Patent No. 10-0447840.

An aircraft brake disc is composed of a pressure disc, a rear disc, and rotary discs and fixing discs that are alternately disposed between the pressure disc and the rear disc.

The pressure disc, the rear disc, the rotary disc, and the fixing disc increase in temperature over 1000° C. due to friction therebetween, when an aircraft is landing. The pressure disc, the rear disc, the rotary disc, and the fixing disc are made of a carbon-carbon composite to maintain friction or mechanical strength against the high temperature.

The carbon-carbon composite is a material that keeps friction or mechanical strength even at a high temperature over 2500° C. and has excellent resistance against thermal shock and excellent thermal conductivity.

Recently, the sizes of the pressure disc, the rear disc, the rotary discs, and the fixing discs of aircraft brake discs have increased with an increase in size of aircrafts.

Accordingly, when aircrafts are landing, the friction areas among the pressure disc, the rear disc, the rotary discs, and the fixing discs increase, so more heat is generated in comparison to the existing aircraft brake discs.

Therefore, there is a need for an aircraft brake disc capable of rapidly discharging heat in comparison to those of the related art.

SUMMARY OF THE INVENTION

An aspect of the present invention provides a method of manufacturing an aircraft brake disc that can rapidly discharge heat in comparison to those of the related art.

According to an aspect of the present invention, there is provided a method of manufacturing a three dimension preform having high thermal conductivity that includes: a first step of manufacturing a unidirectional carbon fabric from a heat resistant fiber; a second step of putting the unidirectional carbon fabric into an aqueous solution with carbon nanomaterials contained in a vessel; a third step of taking the unidirectional carbon fabric out of the vessel and then drying the unidirectional carbon fabric; a fourth step of repeating the second step and the third step; a fifth step of stacking the unidirectional carbon fabrics with web carbon fabrics, which are made of a heat resistant fiber, inserted between the unidirectional carbon fabrics; and a sixth step of punching the stacked unidirectional carbon fabrics and the web carbon fabrics with a needle.

According to another aspect of the present invention, there is provided a method of manufacturing an aircraft brake disc that includes: a first step of manufacturing a three dimension preform including: a first-first step of manufacturing a unidirectional carbon fabric from a heat resistant fiber; a first-second step of putting the unidirectional carbon fabric into an aqueous solution with carbon nanomaterials contained in a vessel; a first-third step of taking the unidirectional carbon fabric out of the vessel and then drying the unidirectional carbon fabric; a first-four step of repeating the first-second step and the first-third step; a first-fifth step of stacking the unidirectional carbon fabrics with web carbon fabrics, which are made of a heat resistant fiber, inserted between the unidirectional carbon fabrics; and a first-sixth step of punching the stacked unidirectional carbon fabrics and the web carbon fabrics with a needle; a second step of depositing carbon on the three dimension preform; a third step of applying heat treatment, shaping, and anti-oxidation coating on the three dimension preform with carbon deposited thereon; and a fourth step of manufacturing a pressure disc, a rear disc, rotary discs, and fixing discs by repeating the first step to the third step and of alternately arranging the rotary discs and the fixing discs between the pressure disc and the rear disc into an assembly.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Hereinafter, a method of manufacturing a three dimension preform having high thermal conductivity according to an embodiment of the present invention will be described in detail.

A method of manufacturing a three dimension preform having high thermal conductivity according to an embodiment of the present invention include: a first step of manufacturing a unidirectional carbon fabric from a heat resistant fiber; a second step of putting the unidirectional carbon fabric into an aqueous solution with carbon nanomaterials contained in a vessel; a third step of taking the unidirectional carbon fabric out of the vessel and then drying the unidirectional carbon fabric; a fourth step of repeating the second step and the third step; a fifth step of stacking the unidirectional carbon fabrics with web carbon fabrics, which are made of a heat resistant fiber, inserted between the unidirectional carbon fabrics; and a sixth step of punching the stacked unidirectional carbon fabrics and the web carbon fabrics with a needle.

The carbon nanomaterial is any one of a carbon nanotube, graphine, and graphite powder.

Hereinafter, a method of manufacturing a three dimension preform having high thermal conductivity will be described in detail, under the assumption that the carbon nanomaterial is a carbon nanotube.

Figure 1:
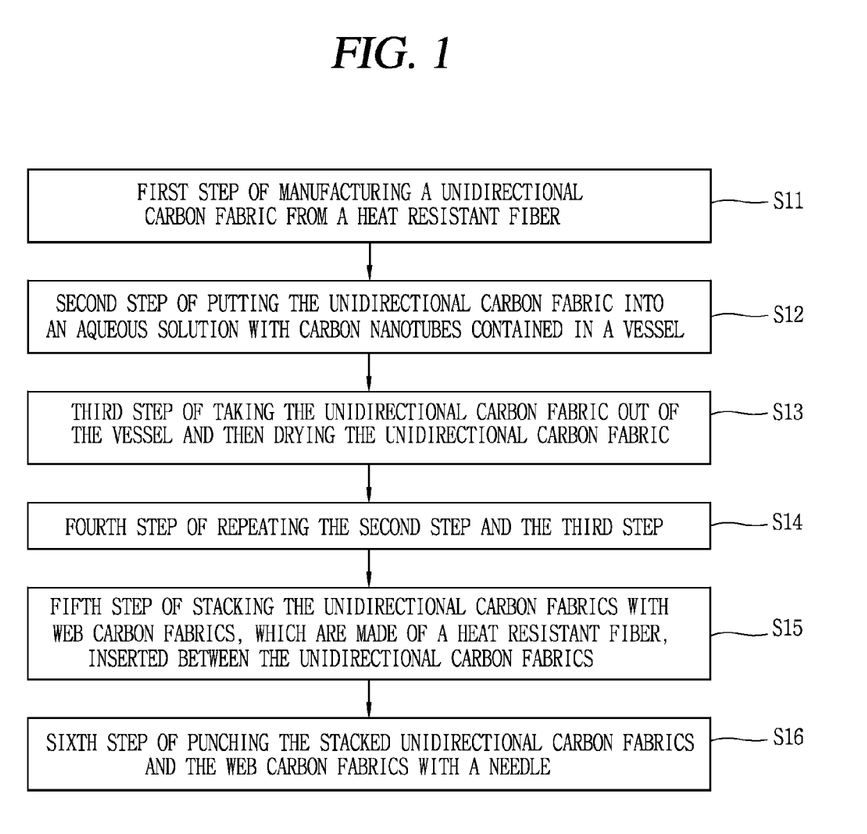
FIG. 1 is a flowchart illustrating a method of manufacturing a three dimension preform having high thermal conductivity according to an embodiment of the present invention.

FIG. 1 is a flowchart illustrating a method of manufacturing a three dimension preform having high thermal conductivity according to an embodiment of the present invention.

As illustrated in FIG. 1, the method of manufacturing a three dimension preform having high thermal conductivity according to an embodiment of the present invention include: a first step of manufacturing a unidirectional carbon fabric from a heat resistant fiber (S11); a second step of putting the unidirectional carbon fabric into an aqueous solution with carbon nanotubes contained in a vessel (S12); a third step of taking the unidirectional carbon fabric out of the vessel and then drying the unidirectional carbon fabric (S13); a fourth step of repeating the second step (S12) and the third step (S13) (S14); a fifth step of stacking the unidirectional carbon fabrics with web carbon fabrics, which are made of a heat resistant fiber, inserted between the unidirectional carbon fabrics (S15); and a sixth step of punching the stacked unidirectional carbon fabrics and the web carbon fabrics with a needle (S16).

The first step (S11) is described first.

Figure 2:
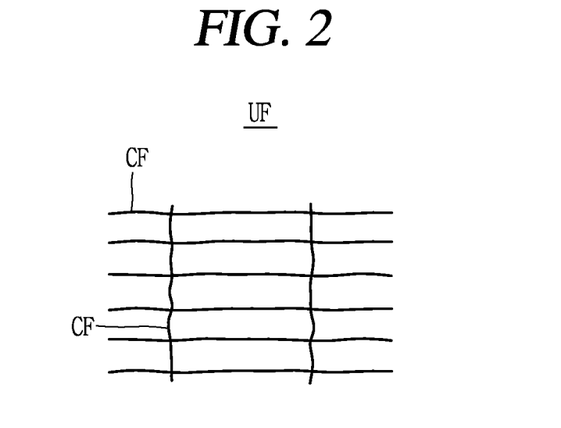
FIG. 2 is a diagram illustrating a unidirectional carbon fabric.

FIG. 2 is a diagram illustrating a unidirectional carbon fabric.

The heat resistant fiber CF may be an oxi-pan fiber, a carbon fiber, or a silicon carbide fiber.

As illustrated in FIG. 2, a unidirectional carbon fabric UF is obtained by laterally arranging heat resistant fibers CF with longitudinal gaps therebetween and then binding the laterally arranged heat resistant fibers CF at predetermined positions without dispersing them.

The second step (S12) is described.

The carbon nanotube CNT, in which hexagons composed of six carbons are coupled to each other in the shape of a pipe, has thermal conductivity equivalent to that of diamond having the highest thermal conductivity in the natural world, and strength one hundred times that of steel.

The carbon nanotube CNT used in the embodiment has the average diameter of 1 to tens of nanometers, the average length of 100 nanometers to tens of micrometers, and purity of 90% or more.

The aqueous solution PS is any one of dimethyl sulfoxide, dimethyl formamide, and dimethyl acetamide.

Acid treatment is applied to the surface of the carbon nanotube CNT. When the surface of the carbon nanotube CNT has undergone acid treatment, a polar group is introduced into the surface of the carbon nanotube CNT, so dispersion of the carbon nanotube in an aqueous solution PS is improved. Accordingly, the carbon nanotube CNT can be uniformly bonded to the unidirectional carbon fabric UF.

Figure 3:
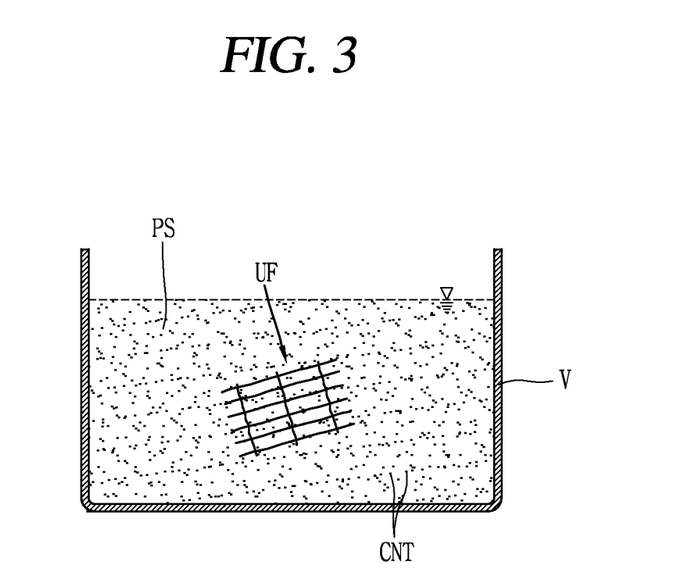
FIG. 3 is a diagram when the unidirectional carbon fabric illustrated in FIG. 2 is sunk in an aqueous solution with carbon nanotubes contained in a vessel.

FIG. 3 is a diagram when the unidirectional carbon fabric illustrated in FIG. 2 is sunk in an aqueous solution with carbon nanotubes contained in a vessel.

As illustrated in FIG. 3, the unidirectional carbon fabric UF is sunk in an aqueous solution PS with surface-treated carbon nanotubes CNT contained in a vessel V for 1 to 2 hours.

The third step (S13) is described.

Figure 4:
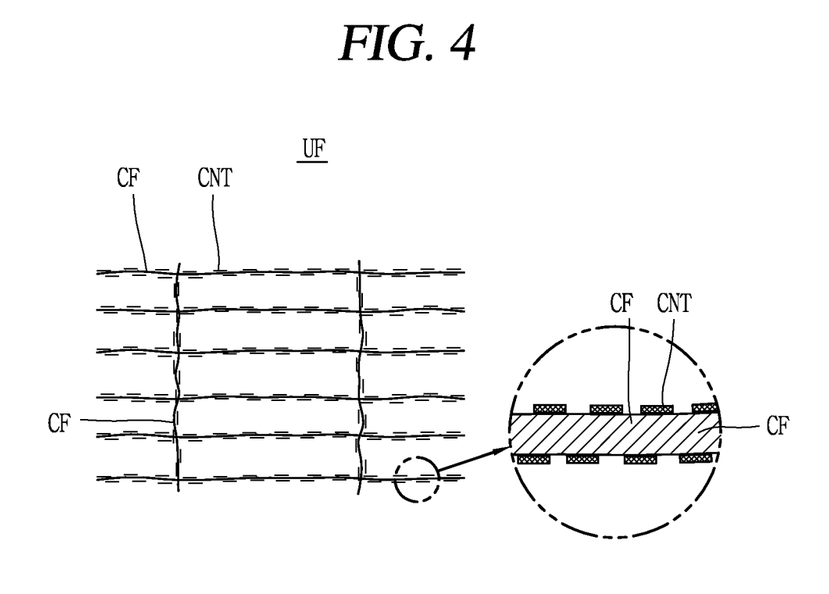
FIG. 4 is a diagram when the unidirectional carbon fabric of FIG. 3 is taken out of the vessel and then dried.

FIG. 4 is a diagram when the unidirectional carbon fabric of FIG. 3 is taken out of the vessel and then dried.

The unidirectional carbon fabric UF is taken out of the vessel V and then dried at room temperature for 1 to 2 hours. In order to rapidly dry the unidirectional carbon fabric and improve the bonding force of the carbon nanotubes CNT, the unidirectional carbon fabric UF is passed through between two rollers, right after being taken out of the vessel V. The two rollers remove the aqueous solution PS from the unidirectional carbon fabric UF and firmly attach the carbon nanotubes CNT to the surface of the unidirectional carbon fabric UF.

As illustrated in FIG. 4, while the unidirectional carbon fabric UF is dried at room temperature, the carbon nanotubes CNT are bonded to the unidirectional carbon fabric UF.

The fourth step (S14) is described.

Figure 5:
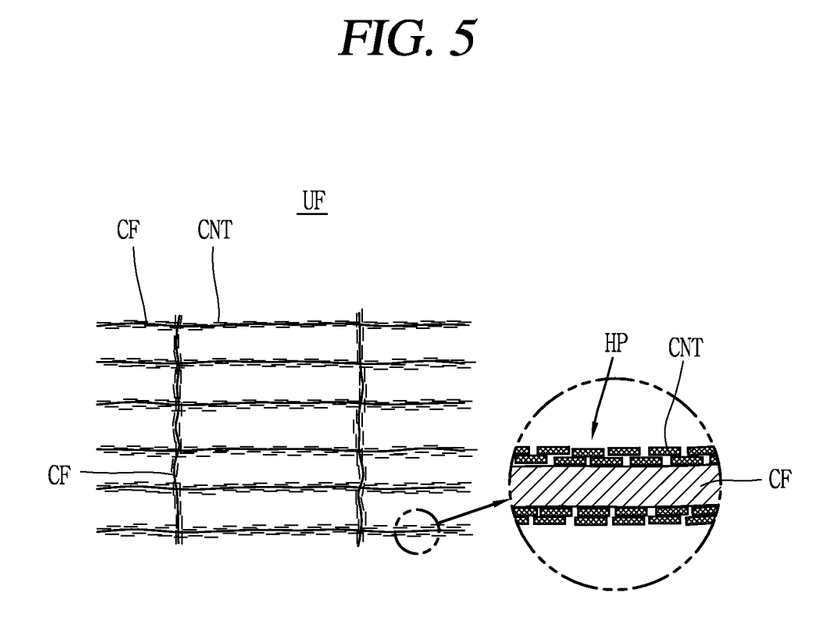
FIG. 5 is a diagram when carbon nanotubes alternately and partially overlap each other and are bonded to the surfaces of the unidirectional carbon fabric.

FIG. 5 is a diagram when carbon nanotubes alternately and partially overlap each other and are bonded to the surfaces of the unidirectional carbon fabric.

By repeating the second step (S12) and the third step (S13), the carbon nanotubes CNT alternately and partially overlap each and are bonded to the surfaces of the unidirectional carbon fabric UF. Three to five times of repetition is suitable.

When the steps are repeated less three times, the carbon nanotubes CNT are difficult to alternately and partially overlap each other. In contrast, when the steps are repeated over five times, the carbon nanotubes CNT alternately and partially overlap each other too much, so the strength of the unidirectional carbon fabric UF becomes too high due to the carbon nanotubes CNT. Accordingly, the needle may break in needling punching. Accordingly, three to five times of repetition is suitable.

As the carbon nanotubes CNT alternately and partially overlap each other, thermal paths HP are formed on the surface of the unidirectional carbon fabric UF. The friction heat between the pressure disc, rear disc, rotary disc, and fixing disc can be rapidly discharged outside through the thermal paths HP.

The fifth step (S15) is described.

Figure 6A:
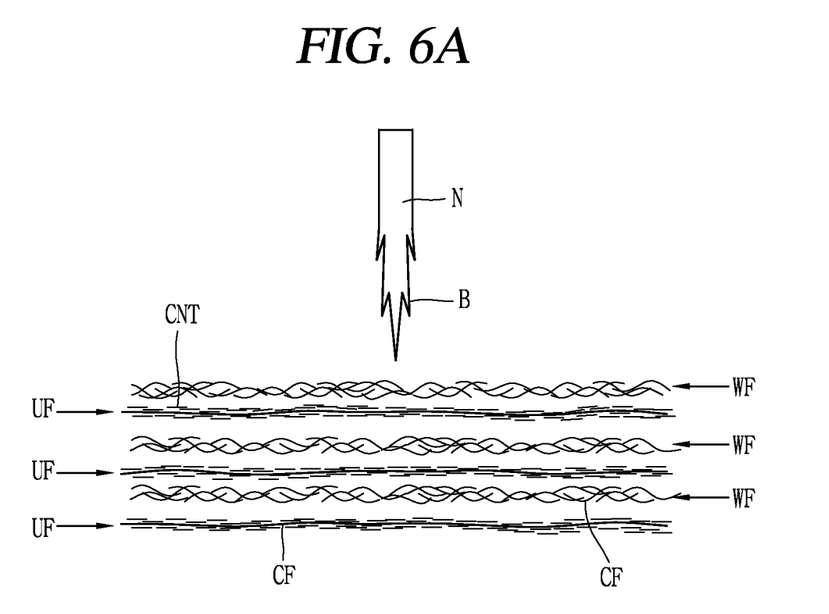
FIG. 6A is a diagram illustrating that web carbon fabrics are stacked between the unidirectional carbon fabrics illustrated in FIG. 5.
Figure 6B:
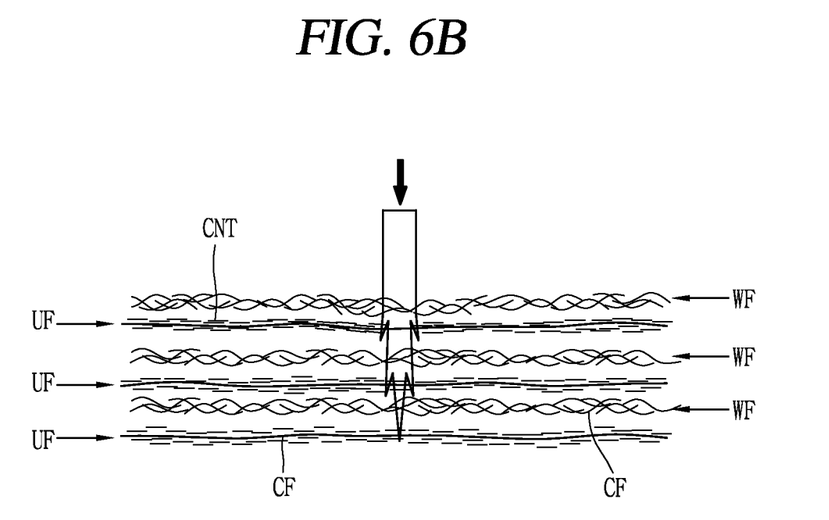
FIG. 6B is a diagram illustrating needle punching, when a needle passes through the stacked unidirectional carbon fabrics and web carbon fabrics illustrated in FIG. 6A.
Figure 6C:
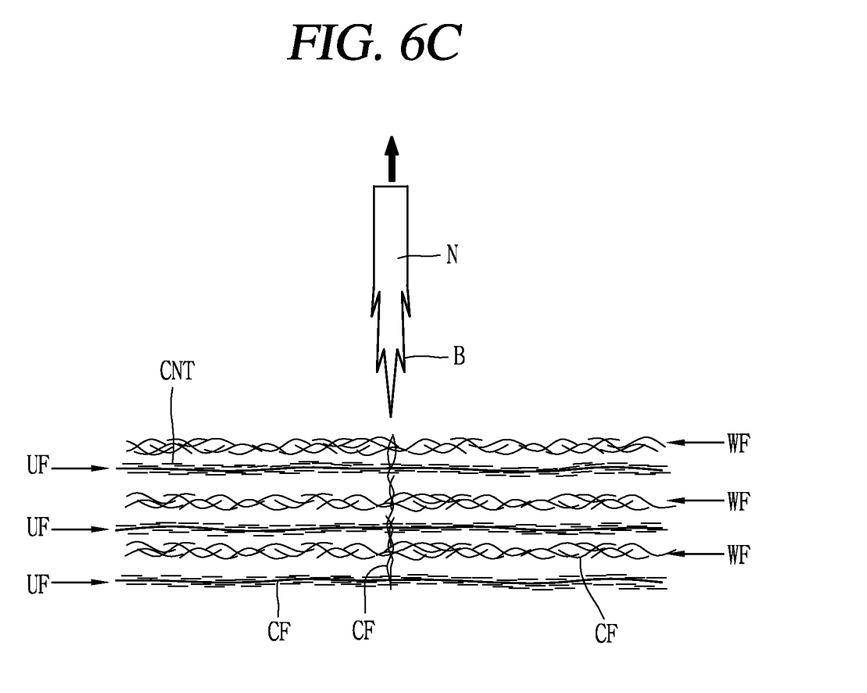
FIG. 6C is a diagram illustrating needle punching, when the heat resistant fibers of the web carbon fabrics combine the unidirectional carbon fabrics in a direction Z.

FIG. 6A is a diagram illustrating that web carbon fabrics are stacked between the unidirectional carbon fabrics illustrated in FIG. 5. FIG. 6B is a diagram illustrating needle punching, when a needle passes through the stacked unidirectional carbon fabrics and web carbon fabrics illustrated in FIG. 6A. FIG. 6C is a diagram illustrating needle punching, when the heat resistant fibers of the web carbon fabrics combine the unidirectional carbon fabrics in a direction Z. The solid arrows illustrated in FIGS. 6B and 6C indicate the movement direction of a needle.

As illustrated in FIG. 6A, web carbon fabrics WF are stacked between unidirectional carbon fabrics UF.

The web carbon fabrics WF are made of heat resistant fibers disconnected from each other and randomly scattered. The heat resistant fibers of the web carbon fabrics WF function as staple fibers that bind the stacked unidirectional carbon fabrics UF in a direction Z (vertical).

The sixth step (S16) is described.

As illustrated in FIGS. 6B and 6C, the stacked unidirectional carbon fabrics UF are punched by a needle N of a needle punching machine (not illustrated) that is moved up and down. As illustrated in FIG. 6B, when the needle N moves down, points B on the needle N drag the heat resistant fibers CF of the web carbon fabrics WF down in the direction Z. The heat resistant fibers CF dragged down bind the stacked unidirectional carbon fabrics UF in the direction Z.

A three dimension preform having high thermal conductivity is achieved through the first step (S11) to the sixth step (S16).

Hereinafter, a method of manufacturing an aircraft brake disc from a three dimension preform having uniform density according to a first embodiment of the present invention is described in detail.

Figure 7:
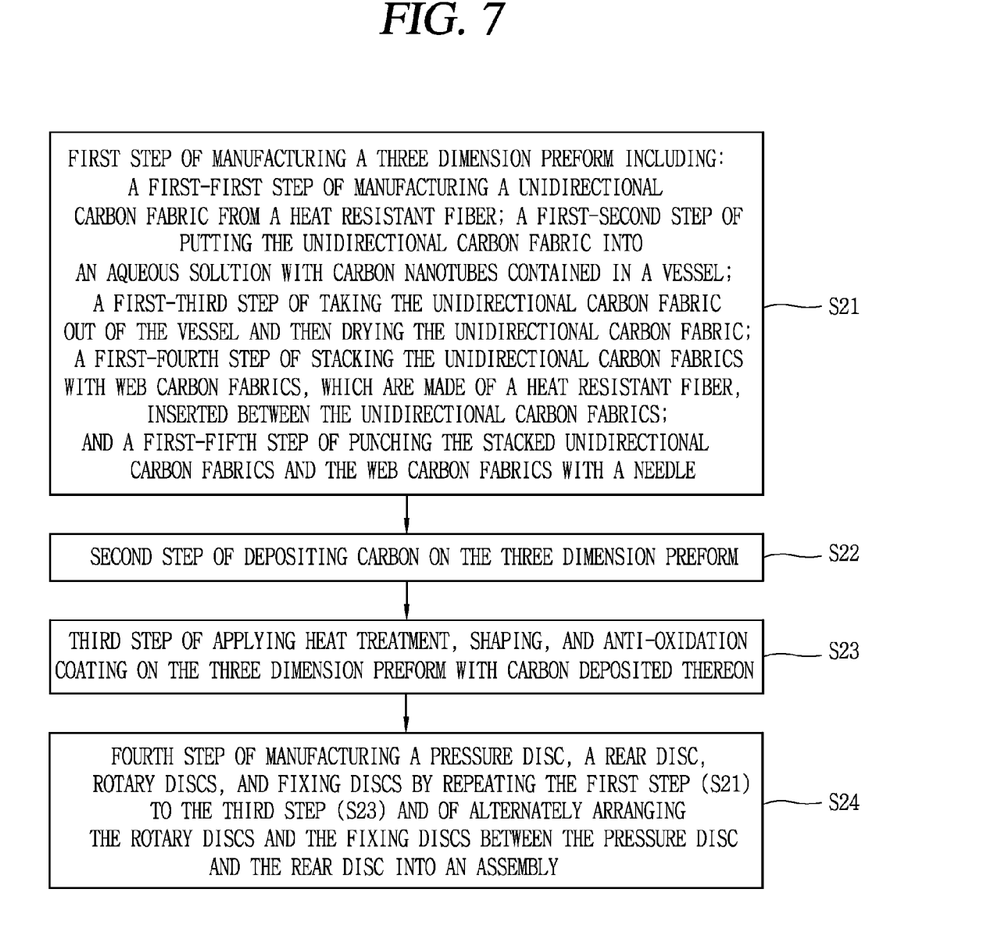
FIG. 7 is a flowchart illustrating a method of manufacturing an aircraft brake disc according to an embodiment of the present invention.

FIG. 7 is a flowchart illustrating a method of manufacturing an aircraft brake disc according to an embodiment of the present invention.

As illustrated in FIG. 7, a method of manufacturing an aircraft brake disc according to an embodiment of the present invention includes: a first step (S21) of manufacturing a three dimension preform including: a first-first step of manufacturing a unidirectional carbon fabric from a heat resistant fiber; a first-second step of putting the unidirectional carbon fabric into an aqueous solution with carbon nanotubes contained in a vessel; a first-third step of taking the unidirectional carbon fabric out of the vessel and then drying the unidirectional carbon fabric; a first-fourth step of stacking the unidirectional carbon fabrics with web carbon fabrics, which are made of a heat resistant fiber, inserted between the unidirectional carbon fabrics; and a first-fifth step of punching the stacked unidirectional carbon fabrics and the web carbon fabrics with a needle; a second step of depositing carbon on the three dimension preform (S22); a third step of applying heat treatment, shaping, and anti-oxidation coating on the three dimension preform with carbon deposited thereon (S23); and a fourth step of manufacturing a pressure disc, a rear disc, rotary discs, and fixing discs by repeating the first step (S21) to the third step (S23) and of alternately arranging the rotary discs and the fixing discs between the pressure disc and the rear disc into an assembly (S24).

The method of manufacturing a three dimension preform in the first step (S21) is the same as the method of manufacturing a three dimension preform having high thermal conductivity according to an embodiment of the present invention, so it is not described here.

The second step (S22) is described.

The three dimension preform is densified, using thermal gradient chemical vapor deposition or liquid impregnation, or a combination of thermal gradient chemical vapor deposition and liquid impregnation.

[Thermal Gradient Chemical Vapor Deposition]

An electrode rod is inserted into a hole at the center of a three dimension preform. The electrode rod is made of graphite. The outer diameter of the electrode rod is 0.2 to 0.5 mm smaller than the inner diameter of the hole at the center of the three dimension preform. The electrode rod heats the three dimension preform. As heat transfers from the center to the outside of the three dimension preform, a thermal gradient is generated in the three dimension preform. When the temperature at the center of the three dimension reaches 700° C. or more, a reaction gas such as methane or propane is supplied. The reaction gas is thermal decomposed. Carbon in the reaction gas is deposited from the center to the outside of the three dimension preform. The density of the reaction gas may be 10 to 100% and the reaction pressure may be 10 to 10,000 torr. The density of the three dimension preform is increased to 1.7 g/cm$^3$ uniformly in the direction X, Y, and Z by depositing carbon to the three dimension preform.

[Liquid Impregnation]

The liquid impregnation deposits carbon to a three dimension preform by repeating several times impregnating and carbonating resin such as pitch or phenol to the three dimension preform. The liquid impregnation is performed in an inactive atmosphere at pressure of the atmospheric pressure or less, and temperature of 700 to 1000° C. The liquid impregnation can easily convert a matrix into a graphite structure, using high heat treatment.

The density of the three dimension preform is increased to 1.7 g/cm$^3$ uniformly in the direction X, Y, and Z by depositing carbon to the three dimension preform.

[Combination of Thermal Gradient Chemical Vapor Deposition and Liquid Impregnation]

The density of a three dimension preform is increased to 1.55 to 1.65 g/cm$^3$ uniformly in the directions of X, Y, and Z, by depositing a reaction gas to the three dimension preform using thermal gradient chemical vapor deposition. Then, the density of the three dimension preform is increased to 1.7 g/cm$^3$ uniformly in the direction X, Y, and Z by depositing carbon to the three dimension preform, using liquid impregnation.

The third step (S23) is described.

The three dimension preform that has been densified undergoes heat treatment at 1,500° C. to 2,800° C. to have suitable friction characteristics, thermal characteristics, and mechanical characteristics, as an aircraft brake disc.

The three dimension preform that has finally undergone heat treatment undergoes mechanical machining to have the shape of an aircraft brake disc.

Anti-oxidation coating is performed to give durability and anti-oxidation to the aircraft brake disc. An anti-oxidation coating solution may be a compound composed of B, BN, $H_3PO_4$, $(Mn(H_3PO_4)_2 2H_2O)$, KOH, $SiO_2$, and $NH_3$.

Figure 8:
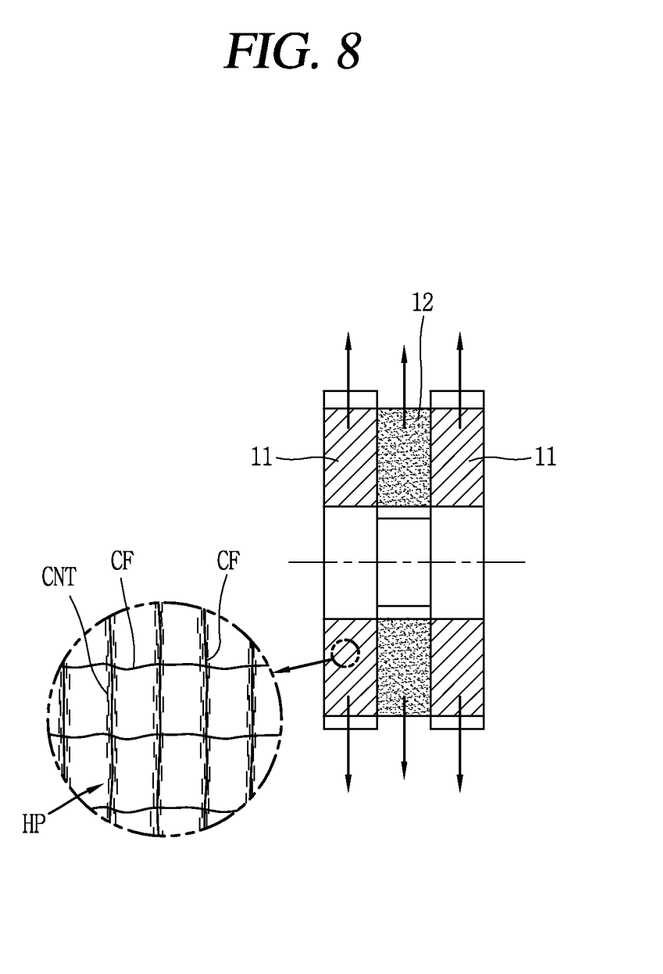
FIG. 8 is a diagram illustrating rotary discs and a fixing disc of an aircraft brake disc manufactured by the method of manufacturing an aircraft brake disc according to an embodiment of the present invention, in which the rotary discs and the fixing discs are in frictional contact with each other when an aircraft is landing.

FIG. 8 is a diagram illustrating rotary discs and a fixing disc of an aircraft brake disc manufactured by the method of manufacturing an aircraft brake disc according to an embodiment of the present invention, in which the rotary discs and the fixing discs are in frictional contact with each other when an aircraft is landing. For simplicity, two rotary discs and one fixing discs between the rotary discs are illustrated in FIG. 8. The solid arrows indicate the transfer directions of friction heat in FIG. 8.

As illustrated in FIG. 8, when an aircraft is landing, the rotary discs 11 and the fixing disc 12 are in frictional contact with each other. Accordingly, friction heat is generated on the friction surfaces between the rotary discs 11 and the fixing disc 12. The friction heat is discharged outside in the radial direction of the rotary discs 11 and the fixing disc 12. The friction heat can be more quickly discharged to the outside through the thermal paths HP formed by the nanotubes CNT.

As the carbon nanomaterial, graphine may be used instead of the carbon nanotube CNT stated in an embodiment of the present invention.

Graphine, the most thin material cut off from graphite, has thermal conductivity two times or more higher than that of diamond known as having the highest thermal conductivity in the natural world, and has strength two hundred or more times that of steel. The graphine is cut off into one layer or two to three layers from graphite, having a thickness of 0.34 to 2 nm.

The embodiment using graphine as a carbon nanomaterial has only to replace the carbon nanotube CNT with graphine, without changing other components in the embodiment including carbon nanotube CNT, so it is not described specifically.

As the carbon nanomaterial, graphite powder may be used instead of the carbon nanotube CNT stated in an embodiment of the present invention.

The graphite powder has good heat resistance, thermal shock resistance, corrosion resistance, and electric and thermal conductivity. The average diameter of the graphite powder is 1 μm to 1 mm.

The embodiment using graphite powder as a carbon nanomaterial has only to replace the carbon nanotube CNT with graphite powder, without changing other components in the embodiment including carbon nanotube CNT, so it is not described specifically.

As set forth above, according to exemplary embodiments of the invention, the carbon nanomaterials (carbon nanotubes, graphine, graphite powder) alternately and partially overlap each other and are bonded to the surfaces of the unidirectional carbon fabric, so thermal paths are formed on the surfaces of the unidirectional carbon fabric. Accordingly, even if the sizes of the pressure disc, rear disc, rotary discs, and fixing discs of an aircraft brake disc increase and much friction heat is generated due to friction between them, the friction heat can be quickly discharged through the thermal paths. Accordingly, it is possible to achieve an aircraft brake disc having high thermal conductivity.

Further, the strength of the pressure disc, rear disc, rotary discs, and fixing discs of an aircraft brake disc is increased by the carbon nanomaterials (carbon nanotubes, graphine, graphite powder) bonded to the unidirectional carbon fabric.

While the present invention has been illustrated and described in connection with the exemplary embodiments, it will be apparent to those skilled in the art that modifications and variations can be made without departing from the spirit and scope of the invention as defined by the appended claims.

What is claimed is:

1. A method of manufacturing a three dimension preform having high thermal conductivity, comprising:
    a first step of manufacturing unidirectional carbon fabrics from a heat resistant fiber;
    a second step of putting the unidirectional carbon fabrics into an aqueous solution with carbon nanomaterial contained in a vessel;
    a third step of taking the unidirectional carbon fabrics out of the vessel and then drying the unidirectional carbon fabrics;
    a fourth step of three to five times repeating the second step and the third step;
    a fifth step of stacking the unidirectional carbon fabrics with web carbon fabrics, which are made of a heat resistant fiber, inserted between the unidirectional carbon fabrics; and
    a sixth step of punching the stacked unidirectional carbon fabrics and the web carbon fabrics with a needle,
    wherein in the fourth step, carbon nanotubes alternately and partially overlap each other and are bonded to surfaces of the unidirectional carbon fabrics, so thermal paths are formed on the surfaces of the unidirectional carbon fabrics.

2. The method of claim 1, wherein the carbon nanomaterial is any one of a carbon nanotube, graphine, and graphite powder.

3. The method of claim 2, wherein the carbon nanotube has an average diameter of 1 to tens of nanometers, an average length of 100 nanometers to tens of micrometers, and purity of 90% or more.

4. The method of claim 3, wherein acid treatment is applied to the surface of the carbon nanotube CNT.

5. The method of claim 2, wherein the graphine is cut off into one layer or two to three layers from graphite, having a thickness of 0.34 to 2 nm.

6. The method of claim 5, wherein acid treatment is applied to the surface of the graphine.

7. The method of claim 1, wherein the aqueous solution is any one of dimethyl sulfoxide, dimethyl formamide, and dimethyl acetamide.

8. The method of claim 1, wherein in the third step, the unidirectional carbon fabric is passed through between two rollers, right after being taken out of the vessel.

9. A method of manufacturing an aircraft brake disc, comprising:
    a first step of manufacturing a three dimension preform including: a first-first step of manufacturing unidirectional carbon fabrics from a heat resistant fiber;
        a first-second step of putting the unidirectional carbon fabrics into an aqueous solution with carbon nanomaterial contained in a vessel;
        a first-third step of taking the unidirectional carbon fabrics out of the vessel and then drying the unidirectional carbon fabrics;
        a first-fourth step of three to five times repeating the first-second step and the first-third step;
        a first-fifth step of stacking the unidirectional carbon fabrics with web carbon fabrics, which are made of a heat resistant fiber, inserted between the unidirectional carbon fabrics; and
        a first-sixth step of punching the stacked unidirectional carbon fabrics and the web carbon fabrics with a needle;
    a second step of depositing carbon on the three dimension preform;
    a third step of applying heat treatment, shaping, and anti-oxidation coating on the three dimension preform with carbon deposited thereon; and
    a fourth step of manufacturing a pressure disc, a rear disc, rotary discs, and fixing discs by repeating the first step to the third step and of alternately arranging the rotary discs and the fixing discs between the pressure disc and the rear disc into an assembly,
    wherein in the first-fourth step, the carbon nanotubes alternately and partially overlap each other and are bonded to the surfaces of the unidirectional carbon fabrics, so thermal paths are formed on the surfaces of the unidirectional carbon fabrics.

* * * * *